US009709251B2

(12) United States Patent
Wang et al.

(10) Patent No.: US 9,709,251 B2
(45) Date of Patent: Jul. 18, 2017

(54) ENGAGEMENT STRUCTURE, BACKLIGHT MODULE AND DISPLAY DEVICE

(71) Applicant: BEIJING BOE OPTOELECTRONICS TECHNOLOGY CO., LTD., Beijing (CN)

(72) Inventors: Xuerong Wang, Beijing (CN); Haiwei Sun, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 366 days.

(21) Appl. No.: 14/087,255

(22) Filed: Nov. 22, 2013

(65) Prior Publication Data
US 2014/0146523 A1 May 29, 2014

(30) Foreign Application Priority Data
Nov. 23, 2012 (CN) ............... 2012 2 0628221 U

(51) Int. Cl.
F21V 7/04 (2006.01)
F21V 21/00 (2006.01)
H05K 5/02 (2006.01)
G02F 1/1333 (2006.01)

(52) U.S. Cl.
CPC ........ *F21V 21/00* (2013.01); *G02F 1/133308* (2013.01); *H05K 5/02* (2013.01); *G02F 2001/133314* (2013.01); *G02F 2001/133325* (2013.01); *G02F 2201/46* (2013.01)

(58) Field of Classification Search
CPC ........ G02F 2001/133314; G02F 2001/133325; G02F 2201/46
USPC ................ 362/97.1, 632, 633, 634
See application file for complete search history.

(56) References Cited

U.S. PATENT DOCUMENTS 6,593,979 B1 * 7/2003 Ha .................... G02F 1/133308
349/187
2002/0054249 A1 * 5/2002 Ryu et al. ....................... 349/58

* cited by examiner

*Primary Examiner* — Andrew Coughlin
*Assistant Examiner* — Meghan Ulanday
(74) *Attorney, Agent, or Firm* — Ladas & Parry LLP

(57) ABSTRACT

Embodiments of the present invention disclose an engagement structure, a crystal backlight module and a display device. The engagement structure is used for fixing an arrangement of the back cover and the mold frame of a display device. The engagement structure comprises a first engaging part provided at the intersection of a first side wall and a second side wall of the back cover, a second engaging part provided on the second side wall of the back cover, and a third engaging part provided on the mold frame corresponding to the first engaging part, wherein the first engaging part and the third engaging part are engage with each another, the second engaging part and a corresponding side surface of the mold frame are pressed against each other, when the back cover and the mold frame are assembled.

18 Claims, 3 Drawing Sheets

ENGAGEMENT STRUCTURE, BACKLIGHT MODULE AND DISPLAY DEVICE

BACKGROUND

Embodiments of the present invention relate to an engagement structure, a backlight module and a display device.

Currently, a backlight module is assembled mainly by a combination of an external metal frame and a mold frame in backlight. FIG. 1 is a schematic view showing an existing engagement structure for fixing an arrangement of a back cover and a metal frame. As shown in FIG. 1, the back cover 31 engages with the metal frame 33 by a punch structure indicated by the elliptical area, which eventually leads to the bonding of the metal frame 33 and the mold frame 32. FIG. 2 is a schematic view showing an existing engagement structure for fixing an arrangement of the back cover and the mold frame. As shown in FIG. 2, the mold frame 2 protrudes from the opening at the corner of the back cover 41 so as to achieve engagement with the back cover 41, and the engagement is further reinforced by the external metal frame 43. The engagement structure for combining the back cover 41 and the mold frame 42 is shown in the elliptical area in FIG. 2. Thus, both of the two structures mentioned above need to use metal frame, which leads to rather complex design and processing procedure. Besides, during assembling the mold frame 42 and the metal frame 43, due to the friction between these two, foreign matters are likely to occur and affect the display quality of the liquid crystal panel.

In the prior art, to reduce the cost and technical complexity of using metal frame, a design of structure without metal frame is proposed. As shown in FIG. 3, the back cover 51 with a punch structure indicated by the elliptical area engages with the mold frame 52, thus achieving the assembly of the backlight module. As shown in FIG. 4, the back cover 61 with a hemming structure indicated by the elliptical area engages with the mold frame 62, thus achieving the assembly of the backlight module. Thus, neither of the two structure designs mentioned above needs to use a metal frame, so that the cost and technical complexity is reduced compared with the design with metal frame. However, the existing structure design without a metal frame, especially for the back cover 61 with a hemming structure as shown in FIG. 4, due to the complexity in itself, leads to an increased cost of a mould for the back cover. Besides, the existing design without a metal frame increases the extension dimension of the display panel, hence not suitable for some small-size liquid crystal panel. Herein, the extension dimension of the display panel is the area between the edge of a liquid crystal display screen and a corresponding edge of the display panel.

SUMMARY

An embodiment of the present invention provides an engagement structure for fixing an arrangement of the back cover and the mold frame of a display device The back cover comprises a first side wall and a second side wall adjacent to each other. The engagement structure comprising a first engaging part provided at the intersection of the first side wall and the second side wall of the back cover, a second engaging part provided on the second side wall of the back cover, and a third engaging part provided on the mold frame corresponding to the first engaging part, wherein the first engaging part and the third engaging part are engage with each another, the second engaging part and a corresponding side surface of the mold frame are pressed against each other, when the back cover and the mold frame are assembled.

In an example, the first engaging part is an opening provided at the intersection of the first side wall and the second side wall of the back cover.

In an example, wherein the third engaging part is a protrusion provided on the mold frame.

In an example, the protrusion and the opening match in shape and size.

In an example, the second engaging part is a projection provided on the second side wall of the back cover, for pressing against the corresponding side surface of the back cover.

In an example, the projection provided on the second side wall of the back cover is a structure with a Ω-shaped cross-section, which is comprised of two horizontal sections and a bending section interposed therebetween.

In an example, the first side wall is substantially parallel to a display screen of the display device.

Another embodiment of the present invention provides a backlight module comprising a back cover and a mold frame, wherein the back cover comprises a first side wall and a second side wall adjacent to each other, the back cover and the mold frame is formed to have an engagement structure described as above for fixing an arrangement of the back cover and the mold frame.

A further embodiment of the present invention provides a display device comprising the backlight module described as above.

BRIEF DESCRIPTION OF THE DRAWINGS

In order to clearly illustrate the technical solutions of embodiments of the present invention, in the following, the accompanying drawings of the embodiments and existing technologies will be described briefly; it is obvious that the following description of the drawings only relates to some embodiments of the invention and thus not limitative of the invention.

DETAILED DESCRIPTION

In order to clearly illustrate the technical solutions of embodiments of the present invention, in the following, the accompanying drawings of the embodiments and existing technologies will be described briefly; it is obvious that the following description of the drawings only relates to some embodiments of the invention and thus not limitative of the invention.

Figure 5A:
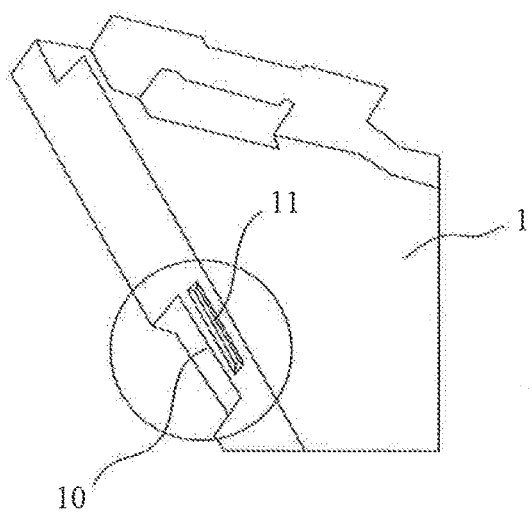
FIG. 5A is a partial schematic structural view illustrating a back cover in accordance with an embodiment of the present invention.
Figure 5B:
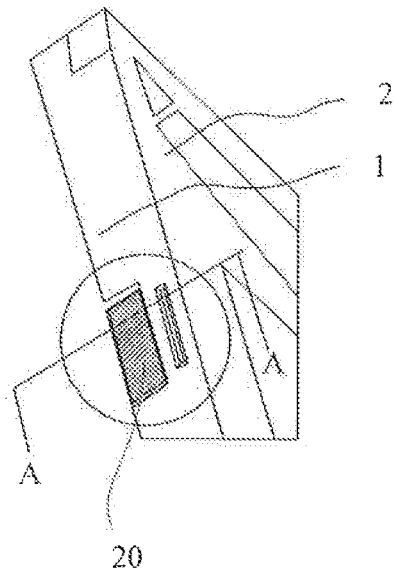
FIG. 5B is a partial schematic structural view illustrating a structure obtained by combining a back cover and a mold frame in accordance with an embodiment of the present invention.
Figure 6:
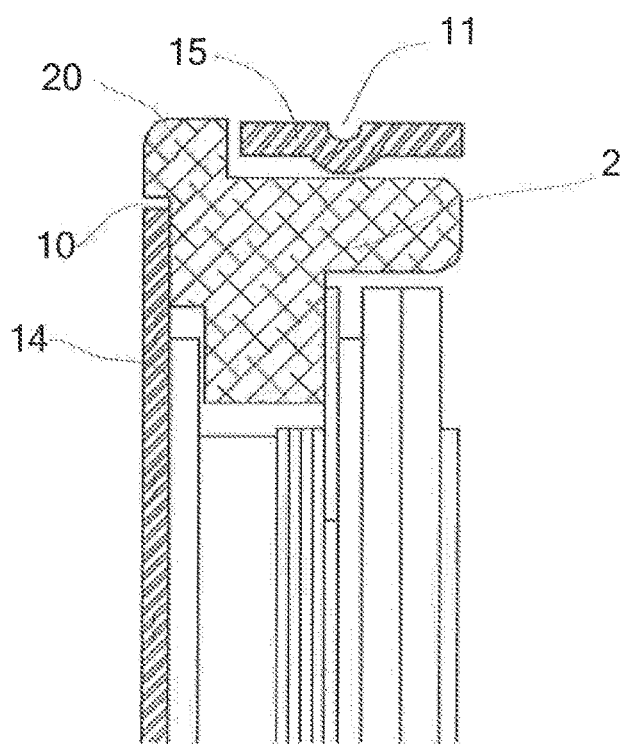
FIG. 6 is a cross-sectional view cross-sectional view taken along line A-A in FIG. 5B.

FIG. 5A is a partial schematic structural view showing a back cover at an engagement structure thereof in accordance with an embodiment of the present invention. FIG. 5B is a partial schematic structural view showing a structure obtained by assembling the back cover and a mold frame in accordance with an embodiment of the present invention. As shown in FIGS. 5A and 5B and FIG. 6, the back cover 1 comprises a first side wall 14 and a second side wall 15. In an example, the first side wall 14 and the second side wall 15 of the board are adjacent and substantially perpendicular to each other. A first engaging part 10 is provided on the back cover 1. In an example, the first claiming section 10 is at least one opening provided at the intersection of the first side wall 14 and the second side wall 15 of the back cover 1. The opening, for example, forms gap in the shape of rectangular, square, or any other shape on the first side wall 14 and/or the second side wall 15.

A third engaging part 20 is provided on the mold frame 2, corresponding to the first engaging part 10 on the back cover 1. The third engaging part 20 is at least one protrusion, for example, provided on a side wall of the mold frame 2. The protrusion 20 and the opening 10 match in size and shape, so as to achieve locking engagement between the first engaging part 10 and the third engaging part 20.

A second engaging part 11 is provided on the second side wall 15 of the back cover 1, projecting toward the space where the mold frame 2 is to be mounted. The second engaging part 11 and the first engaging part 10 are substantially equal in length. When the back cover 1 and the mold frame 2 are assembled, the second engaging part 11 and the corresponding side surface of the mold frame 2 form a line-to-surface contact, as shown in FIG. 6. The second engaging part 11 is, for example, provided above the first engaging part 10.

Figure 1:
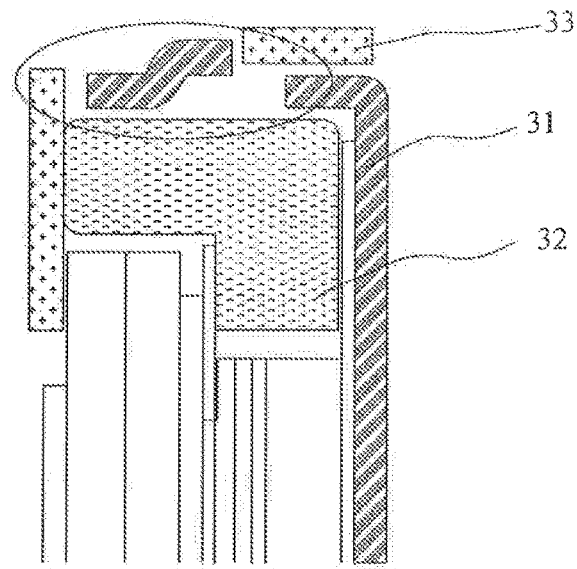
FIG. 1 is a schematic view illustrating an existing engagement structure for combining a back cover and a metal frame.
Figure 2:
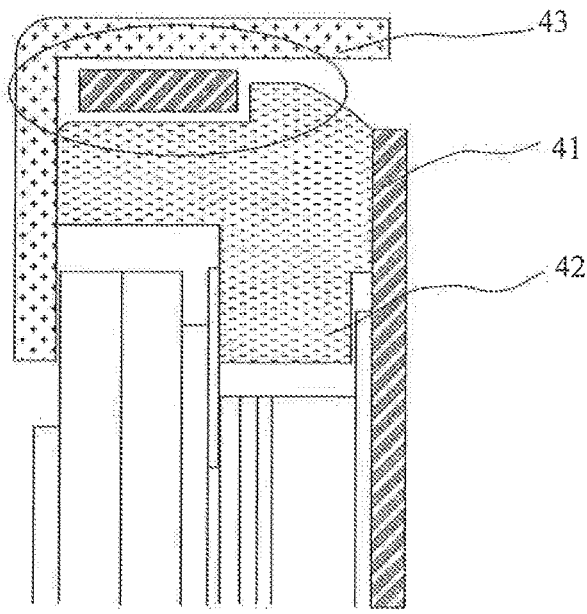
FIG. 2 is a schematic view illustrating an existing engagement structure for combining a back cover and a mold frame.
Figure 3:
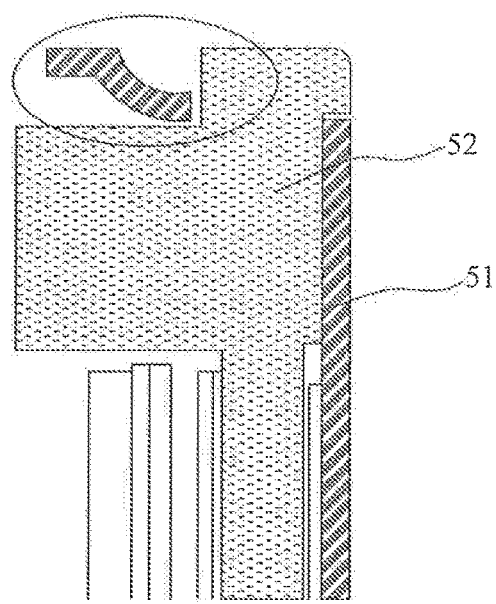
FIG. 3 is a schematic view illustrating an existing engagement structure for combining a mold frame and a back cover with a punch structure.
Figure 4:
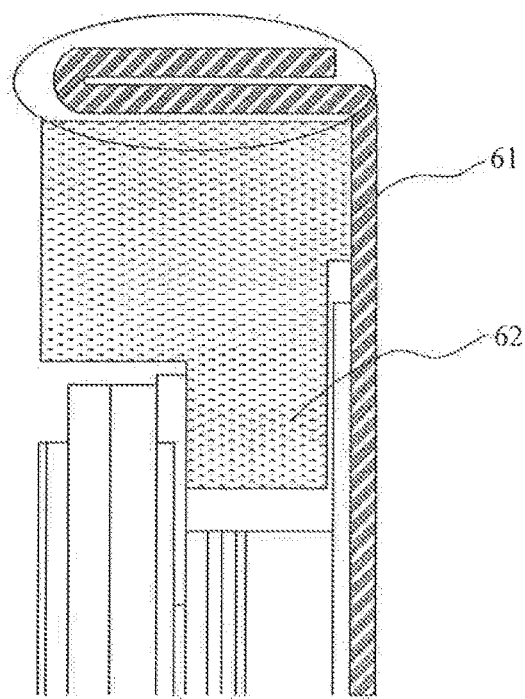
FIG. 4 is a schematic view illustrating an existing engagement structure for combining a mold frame and a back cover with a hemming structure.

As can be seen from FIG. 6, when the back cover 1 and the mold frame in accordance with the embodiment of the present invention are assembled, the first engaging part 10 provided at the intersection of the first side wall 14 and the second side wall of the back cover 1 is engaged with the third engaging part 20 provided at the mold frame 2, and the second engaging part 11 provided on the second side wall 15 of the back cover 1 presses against the corresponding side surface of the mold frame 2. Compared with the existing surface-to-surface contact between the back cover 61 and the mold frame 62, as shown in FIG. 4, the engagement structure in accordance with the embodiment of the present invention is designed to be more compact and stable. Besides, when the arrangement of the back cover 1 and the mold frame 2 is fixed by the engagement structure in accordance with an embodiment of the present invention, foreign matters are unlikely to occur due to absence of a metal frame, hence ensuring the display quality of the liquid crystal panel.

The second engaging part 11, as shown in FIG. 6, is a structure having a cross-section in a Ω-like shape which comprises two horizontal sections and a bending section interposed therebetween. The second engaging part 11 can be formed by punching the second side wall 15 of the back cover.

Compared with the engagement design with a hemming structure, the second engaging part in accordance with the embodiment of the present invention can be formed by using a simple mould, hence considerably reducing manufacturing cost. On the other hand, the second engaging part in accordance with the embodiment of the present invention is a Ω shaped single-layer, rather than the existing double-layer hemming structure, hence considerably reducing the thickness of the engaging part, which in turn reduces the extension dimension of the display panel.

Another embodiment of the present invention provides a backlight module comprising a back cover 1 and mold frame 2, wherein the back cover 1 comprises a first side wall 14 and a second side wall 15 adjacent to each other. A first engaging part 10 is provided at the intersection of the first side wall 14 and the second side wall 15 of the back cover 1, and a second engaging part 11 is provided on the second side wall of the back cover 1. A third engaging part 20 is provided on the mold frame 2, corresponding to the first engaging part 10. In the case that the back cover 1 and the mold frame 2 are assembled, the first engaging part 10 and the third engaging part 20 are engaged with one another, the second engaging part 11 and the corresponding side surface of the mold frame are pressed against each other.

Yet another embodiment of the present invention further provides a display device comprising a backlight module. The backlight module comprises a back cover 1 and mold frame 2, wherein the back cover 1 comprises a first side wall 14 and a second side wall 15 adjacent to each other. A first engaging part 10 is provided at the intersection of the first side wall 14 and the second side wall 15 of the back cover 1, and a second engaging part 11 is provided on the second side wall of the back cover 1. A third engaging part 20 is provided on the mold frame 2, corresponding to the first engaging part 10. In the case that the back cover 1 and the mold frame 2 are assembled, the first engaging part 10 and the third engaging part 20 are engaged with one another, the second engaging part 11 and the corresponding side surface of the mold frame are pressed against each other.

In the embodiments of the present invention, the second engaging part and the mold frame forms a line-to-surface pressing contact, which is more compact and stable compared with the existing surface-to-surface contact. Besides, when the arrangement of the back cover 1 and the mold frame 2 is fixed by the engagement structure in accordance with an embodiment of the present invention, foreign matters are unlikely to occur due to absence of a metal frame, hence ensuring the display quality of the display device. The display device can be a liquid crystal panel, e-paper, OLED (Organic Light Emitting Diode) panel, a liquid crystal TV set, a liquid crystal monitor, a digital photo album, a mobile phone, a tablet PC, any other product or component with display functions and etc.

Although the present invention has been described in considerable detail with reference to preferred embodiments thereof, some modifications or improvements can still be made on the basis of the present invention, which is evident to those skilled in the art. Therefore, those modifications or improvements, which are made without departing from the spirit of the present invention, all belong to the protection scope of the present.

What is claimed is:

1. An engagement structure for fixing an arrangement of a back cover and a mold frame of a display device, the back cover comprising a first side wall and a second side wall adjacent to each other, wherein the engagement structure comprises a first engaging part provided at the intersection of the first side wall and the second side wall of the back cover, a second engaging part provided on the second side wall of the back cover, and a third engaging part provided on the mold frame corresponding to the first engaging part, wherein the third engaging part is a part of the mold frame,
wherein, in a case that the back cover and the mold frame are assembled, the first engaging part and the third engaging part are interlocked and directly connected with each other, the second engaging part and a corresponding side surface of the mold frame are pressed against each other.

2. The engagement structure according to claim 1, wherein the third engaging part is a protrusion provided on the mold frame.

3. The engagement structure according to claim 1, wherein the second engaging part is a projection provided on the second side wall of the back cover, for pressing against the corresponding side surface of the back cover.

4. The engagement structure according to claim 3, wherein the projection provided on the second side wall of the back cover is a structure with a Ω-shaped cross-section which is comprised of two horizontal sections and a bending section interposed therebetween.

5. The engagement structure according to claim 1, wherein the first side wall is substantially parallel to a display screen of the display device.

6. A backlight module comprising a back cover and a mold frame, wherein the back cover comprises a first side wall and a second side wall adjacent to each other, the back cover and the mold frame is formed to have an engagement structure according to claim 1 for fixing an arrangement of the back cover and the mold frame.

7. A display device comprising the backlight module according to claim 6.

8. The engagement structure according to claim 1, wherein the first engaging part is an opening provided at the intersection of the first side wall and the second side wall of the back cover, the first side wall and the second side wall are substantially perpendicular to each other, the opening is formed to pass through the first side wall and the second side wall of the back cover in their respective thickness directions.

9. The engagement structure according to claim 8, wherein the third engaging part is a protrusion provided on the mold frame.

10. The engagement structure according to claim 9, wherein the protrusion and the opening match hi shape and size.

11. The engagement structure according to claim 8, wherein the second engaging part is a projection provided on the second side wall of the back cover, for pressing against the corresponding side surface of the back cover.

12. The engagement structure according to claim 11, wherein projection provided on the second side wall of the back cover is a structure with a Ω-shaped cross-section which is comprised of two horizontal sections and a bending section interposed therebetween.

13. An engagement structure for fixing an arrangement of a back cover and a mold frame of a display device, the back cover comprising a first side wall and a second side wall adjacent to each other, wherein the engagement structure comprises a first engaging part provided at the intersection of the first side wall and the second side wall of the back cover, a second engaging part provided on the second side wall of the back cover, and a third engaging part provided on the at mold frame corresponding to the first engaging part,
wherein the first engaging part and the third engaging part are interlocked with each another, the second engaging part and a corresponding side surface of the mold frame are pressed against each other, when the back cover and the mold frame are assembled, and
wherein the first engaging part is an opening provided at the intersection of the first side wall and the second side wall of the back cover, the first side wall and the second side wall are substantially perpendicular to each other, the opening is formed to pass through the first side wall and the second side wall of the back cover in their respective thickness directions.

14. The engagement structure according to claim 13, wherein the third engaging part is a protrusion provided on the mold frame.

15. The engagement structure according to claim 14, wherein the protrusion and the opening match in shape and size.

16. The engagement structure according to claim 13, wherein the second engaging part is a projection provided on the second side wall of the back cover, for pressing against the corresponding side surface of the back cover.

17. The engagement structure according to claim 16, wherein projection provided on the second side wall of the back cover s a structure with a Ω-shaped cross-section which is comprised of two horizontal sections and a bending section interposed therebetween.

18. An engagement structure for fixing an arrangement of a back cover and a mold frame of a display device, the back cover comprising a first side wall and a second side wall adjacent to each other, wherein the engagement structure comprises a first engaging part provided at the intersection of the first side wall and the second side wall of the back cover, a second engaging part provided on the second side wall of the back cover, and a third engaging part provided on the mold frame corresponding to the first engaging part,
wherein the first engaging part and the third engaging part are interlocked with each another, the second engaging part and a corresponding side surface of the mold frame are pressed against each other, when the back cover and the mold frame are assembled,
wherein the second engaging part is a projection provided on the second side wall of the back cover, for pressing against the corresponding side surface of the back cover, and
wherein the projection provided on the second side wall of the back cover is a structure with a Ω-shaped cross-section which is comprised of two horizontal sections and a bending section interposed therebetween.

* * * * *